US012132517B2

(12) United States Patent
Klop et al.

(10) Patent No.: US 12,132,517 B2
(45) Date of Patent: Oct. 29, 2024

(54) OPTIMIZING ALIGNMENT IN OPTICAL COMMUNICATION (71) Applicant: Nederlandse Organisatie voor toegepast-natuurwetenschappelijk onderzoek TNO, 's-Gravenhage (NL)

(72) Inventors: Willem Arjan Klop, Bruchem (NL); Remco Den Breeje, Papendrecht (NL); Rudolf Saathof, Nieuwegein (NL); Nicolaas Jan Doelman, Burgh-Haamstede (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/767,828

(22) PCT Filed: Oct. 9, 2020

(86) PCT No.: PCT/NL2020/050623
§ 371 (c)(1),
(2) Date: Apr. 8, 2022

(87) PCT Pub. No.: WO2021/071359
PCT Pub. Date: Apr. 15, 2021

(65) Prior Publication Data
US 2024/0088998 A1 Mar. 14, 2024

(30) Foreign Application Priority Data
Oct. 11, 2019 (EP) .................................... 19202674

(51) Int. Cl.
H04B 10/11 (2013.01)
H04B 10/112 (2013.01)

(52) U.S. Cl.
CPC ................................ H04B 10/1123 (2013.01)

(58) Field of Classification Search
CPC ........ H04L 5/143; H04L 5/14; H04B 10/1123
See application file for complete search history.

(56) References Cited

U.S. PATENT DOCUMENTS 6,381,055 B1 * 4/2002 Javitt ................. H04B 10/1123
398/131
6,556,324 B1 4/2003 Meier
(Continued)

FOREIGN PATENT DOCUMENTS

EP 0325429 A2 7/1989
WO WO 2016/112286 A1 7/2016

OTHER PUBLICATIONS

European Patent Office, International Search Report in corresponding International Application No. PCT/NL2020/050623, dated Dec. 22, 2020 (2 pages).
(Continued)

Primary Examiner — Tanya T Motsinger
(74) Attorney, Agent, or Firm — Leydig, Voit & Mayer, Ltd.

(57) ABSTRACT

A method and system for maintaining an optimized point ahead angle ($\Theta a$) between an uplink beam (U0) from a first terminal (10) to a second terminal (20), and a downlink beam (D0) from the second terminal (20) to the first terminal (10). While transmitting data via a transmission channel (Tx) from the first terminal (10) to the second terminal (20), a directional variation ($\Delta\Theta$) is applied to an initial point ahead angle ($\Theta 0$) for emitting the uplink beam (U1,U2) along different point ahead angles ($\Theta 1, \Theta 2$). A respective intensity (I1,I2) is determined of a part of the uplink beam (U1,U2), received by the second terminal (20), emitted by the first terminal (10) along a respective point ahead angle ($\Theta 1, \Theta 2$). The initial point ahead angle ($\Theta 0$) is adjusted towards an optimized point ahead angle ($\Theta a$) based on the (Continued)

respective intensity (I1,I2) as function of the different point ahead angles (Θ1,Θ2).

20 Claims, 2 Drawing Sheets (56) References Cited

U.S. PATENT DOCUMENTS

| | | | |
|---|---|---|---|
| 6,577,421 | B1 | 6/2003 | Cheng et al. |
| 9,057,604 | B1 | 6/2015 | Fink |
| 10,298,325 | B1* | 5/2019 | Birnbaum .............. H04B 10/40 |
| 10,420,108 | B2* | 9/2019 | Wang ................. H04B 7/18513 |
| 11,689,283 | B1* | 6/2023 | Efthyvoulos ...... H04B 10/1129 |
| | | | 398/119 |
| 2003/0044636 | A1 | 3/2003 | Sakanaka |
| 2004/0141753 | A1 | 7/2004 | Andreu-von Euw et al. |
| 2005/0083412 | A1* | 4/2005 | Murphy ............. H04B 7/18595 |
| | | | 725/67 |
| 2016/0007220 | A1* | 1/2016 | Suzuki ..................... H04L 1/00 |
| | | | 370/280 |
| 2018/0309561 | A1* | 10/2018 | Nozawa ................ H04W 72/04 |
| 2018/0367289 | A1* | 12/2018 | Kim ...................... H04L 5/0078 |
| 2019/0081703 | A1* | 3/2019 | Miller .................... H04B 10/40 |
| 2020/0403688 | A1* | 12/2020 | Zhan ..................... H04W 16/14 |
| 2021/0250093 | A1* | 8/2021 | Dickson ................ H04L 1/0042 |
| 2021/0409106 | A1* | 12/2021 | Ashworth ........... H04W 52/243 |
| 2024/0129908 | A1* | 4/2024 | Hao .................. H04W 72/0446 |

OTHER PUBLICATIONS

Shu-Jun Liu, "Stochastic Averaging in Continuous Time and Its Applications to Extremum Seeking," IEEE Transactions on Automatic Control, vol. 55, No. 10, pp. 2235-2250 (Oct. 2010).

Dimitrios N. Loizos, "A Robust Continuous-Time Multi-Dithering Technique for Laser Communications using Adaptive Optics," IEEE, ISCAS 2006, pp. 3626-3629 © 2006.

T.R. O'Meara, "The Multidither Principle in Adaptive Optics," J. Opt. Soc. Am., vol. 67, No. 3, pp. 306-315 (Mar. 1977).

European Patent Office, Examination Report in corresponding European Application No. 20789703.4 dated Sep. 1, 2023 (9 pages).

* cited by examiner

OPTIMIZING ALIGNMENT IN OPTICAL COMMUNICATION

CROSS-REFERENCE TO RELATED APPLICATIONS

This patent application is a U.S. National Phase of PCT International Application No. PCT/NL2020/050623, filed Oct. 9, 2020, which claims priority to European Application No. 19202674.8, filed Oct. 11, 2019, which are both expressly incorporated by reference in their entireties, including any references contained therein.

TECHNICAL FIELD AND BACKGROUND

The present disclosure relates to optical communication between terminals, e.g. maintaining or optimizing a point ahead angle between communication beams going back and forth between the terminals.

As background, a paper by Walter R. Leeb ["Laser Space Communications: Systems, Technologies, and Applications", The Review of Laser Engineering, December 2000, pp. 804-808] describes the basic concept and functions of an optical terminal on board a spacecraft. The requirements on data transmitters and receivers as well as on optical antennas and pointing, acquisition and tracking ("PAT") mechanisms are discussed. While the paper is focused on intersatellite communication, similar aspects may arise for communication between a earth based station and a satellite in orbit.

As discussed in the paper, to establish an optical link, a spatial pointing and acquisition procedure can be initiated. Information on the position of the space terminal(s) may be available. Still, because of position uncertainty and incomplete knowledge of the spacecraft's orientation (attitude uncertainty), one terminal's beam width can be widened deliberately as to illuminate the second terminal despite the uncertainty in position. A spatial search operation by the (narrow beam) receive path of the second, and subsequently, of the first terminal may follow before acquisition is completed and switching to the tracking mode can occur. During data transmission, the angle between the line-of-sight and the transmit beam axis typically needs to be kept to within a fraction of the transmit beam width which may be as small as a few μrad. To maintain sufficient alignment of the transmit and receive antennas despite platform vibrations, the terminal(s) can be equipped with a tracking servo loop. Optical beacons can be provided in both directions to render input information for the control loops. The data carrying beams themselves may serve as beacon, or separate optical beams may be implemented, e.g. in a one-way link.

As further discussed in the paper, one critical aspect of laser communications with narrow beams results from the need to introduce a point ahead angle. Because of the finite velocity of light "c" and the relative angular velocity of the communication terminal(s) moving in space, the transmit beam can be directed towards the receiver's position it will have at some later time. This point ahead angle can be described by $$\beta = \frac{2v_R}{c},$$

where $v_R$ is the relative velocity component of transmitter and receiver, orthogonal to the line-of sight. Point ahead may be used in both dimensions. It typically amounts up to 40 μrad for a GEO-GEO link and up to 70 μrad for a LEO-GEO link. For communication with between a earth based station and geostationary satellite, the angle may be about 18.5 μm. So the angle may be appreciably larger than the beam width. The point ahead angle can be introduced in either the receive or the transmit path of each transceiver and may be adjustable if $v_R$ varies with time. The paper notes it is difficult to design a control loop for automatic adjustment of point ahead. Therefore it is typical to rely on the calculation of point ahead angles from known ephemeris data and on open loop implementation.

As further background, EP 0 325 429 A2 describes a multiple access communication system. Here a small portion of an incoming beam is stripped off to pass to an acquisition and tracking sensor and drive unit Data from an acquisition sensor is processed during an acquisition phase to determine the direction of arrival of an incoming beam (a communications beam or an acquisition beam) to provide data for the system control unit to drive its outer pointing mechanism in the direction of the incoming beam. A transmission beam is generated at a laser diode package whence it passes to a point ahead assembly. The point ahead assembly deflects the transmit beam relative to the received beam by an amount to compensate relative movements. Control data for the point ahead assembly is supplied by the system control unit.

It is yet desired to improve optical communication between optical terminals, particularly with regards to maintaining an optimal point ahead angle while preventing interruptions in data transmission.

SUMMARY

Aspects of the present disclosure relate to methods and systems for maintaining an optimized point ahead angle between an uplink beam from a first terminal to a second terminal, and a downlink beam from the second terminal to the first terminal. An optical communication link can be provided between the first terminal and the second terminal. Typically, the communication link comprises at least one reception channel wherein the first terminal receives data via the downlink beam from the second terminal, and one transmission channel wherein the first terminal transmits data via the uplink beam to the second terminal along an initial point ahead angle with respect to the downlink beam. By intentionally applying a directional variation, e.g. jitter, to the initial point ahead angle, the uplink beam is emitted along slightly different point ahead angles at different instances of time. By determining a respective intensity of a part of the uplink beam, received by the second terminal, emitted by the first terminal along a respectively varied point ahead angle, the initial point ahead angle can be adjusted towards an optimized point ahead angle based on the respective intensity as function of the different point ahead angles. By applying the directional variation during active communication, i.e. while transmitting data via the transmission channel of the uplink beam from the first terminal to the second terminal, an optimal point ahead angle can be maintained while preventing interruptions in data transmission, e.g. as opposed to typical calibration procedures to compensate for drift resulting in downtime of the communication link.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
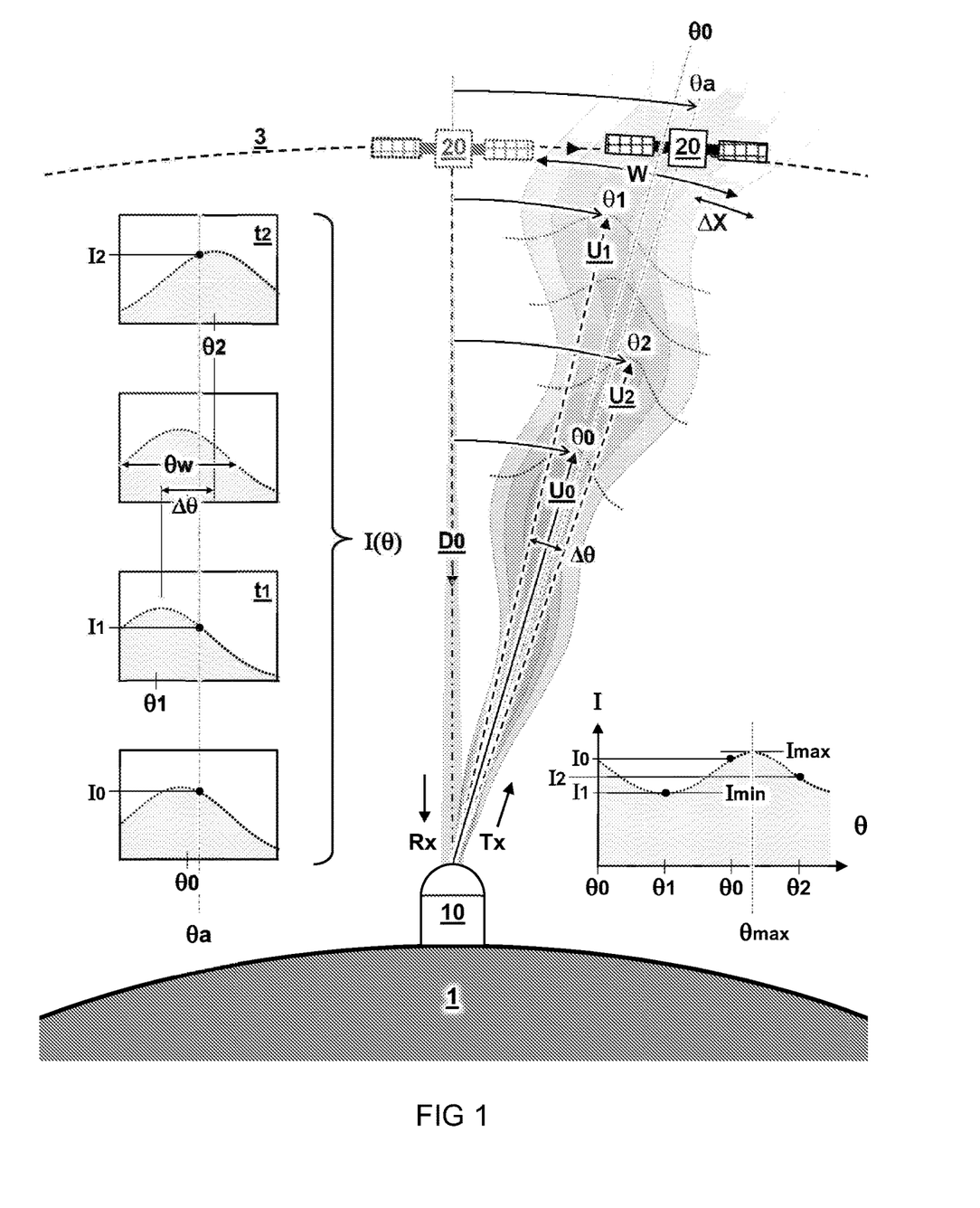
FIG. 1 illustrates varying the direction of an uplink beam to determine an optimized point ahead angle.

FIG. 1 illustrates a method and system for maintaining an optimized point ahead angle θa between an uplink beam U0 from a first terminal 10 to a second terminal 20, and a downlink beam D0 from the second terminal 20 to the first terminal 10

In one embodiment, e.g. as shown, an (optical) communication link is provided between the first terminal 10 and the second terminal 20. In some embodiments, the communication link comprises at least a reception channel Rx wherein the first terminal 10 receives data via the downlink beam D0 from the second terminal 20, and a transmission channel Tx wherein the first terminal 10 transmits data via the uplink beam U0 to the second terminal 20 along an initial point ahead angle θ0 with respect to the downlink beam D0. In a preferred embodiment, as described herein, a directional variation Δθ is applied to the initial point ahead angle θ0. Accordingly the uplink beam (U1,U2) is emitted along different point ahead angles θ1,θ2 at different instances of time t1,t2. Most preferably, the directional variation is applied during active communication, i.e. while transmitting data via the transmission channel Tx from the first terminal 10 to the second terminal 20. Alternatively, or additionally, directional variation as described herein may also be applied before active communication, e.g. for providing initial contact and/or during realignment while contact is interrupted.

In some embodiments, the first terminal 10, e.g. ground station provides multiple uplink beams, e.g. multiple channels. Accordingly, where the present disclosure refers to an uplink beam this may also apply to other or further uplink beams. For example, multiple beams are combined in a multiplexer. In one embodiment, the same directional variation Δθ is applied to all beams simultaneously. In another or further embodiment, the directional variation Δθ is applied individually to one or more of the beams to optimize the beam directions individually.

In one embodiment, a respective intensity I1,I2 is determined of a part of the uplink beam U1,U2, received by the second terminal 20, emitted by the first terminal 10 along a respective point ahead angle θ1,θ2. Accordingly, the initial point ahead angle θ0 can be adjusted towards an optimized point ahead angle θa based on the respective intensity I1,I2 as function of the different point ahead angles θ1,θ2.

In some embodiments, the first terminal 10 is disposed at an earth based station, e.g. on the ground. In other or further embodiments, the second terminal 20 is disposed at a spacecraft, e.g. in orbit above the station. For example, the satellite can be in low earth orbit, geo-stationary orbit, geo-synchronous orbit, or anywhere else in space. The methods and systems described herein may also find application in embodiments wherein the positions of the terminals and respective functions are reversed. For example, the first terminal can be arranged in a spacecraft and the second terminal arranged in a earth based station. The method may also find application for communication between spacecrafts, e.g. wherein each terminal is arranged in a respective satellite orbiting the earth. The earth based station may be fixed or mobile. For example, the first and/or second terminals may be arranged on a moving vehicle such as a car, train, boat, or even an aircraft. Also optical communication between vehicles, or between a vehicle and the ground can be envisaged.

In one embodiment, emitting the uplink beam along the different point ahead angles comprises emitting the uplink beam as a first beam U1 along a first point ahead angle θ1 with respect to the downlink beam D0, and determining a first intensity I1 of a part of the first beam U1 received by the second terminal 20. In another or further embodiment, emitting the uplink beam along the different point ahead angles comprises emitting the uplink beam as a second beam U2 along a second point ahead angle θ2 with respect to the downlink beam D0, wherein the second point ahead angle θ2 is different from the first point ahead angle θ1, and determining a second intensity I2 of a part of the second beam U2 received by the second terminal 20.

In some embodiments, the initial point ahead angle θ0 is adjusted based on a difference between the first intensity I1 and second intensity I2. For example, the initial point ahead angle θ0 is adjusted in a direction of highest intensity (Imax). In one embodiment, a direction of the point ahead angle is continuously varied as a function of time, wherein an average or center of the varying point ahead angle is optimized. For example, a predetermined small directional perturbation may be continuously applied to the uplink beam while the resulting intensity measurements from the second terminal used to keep the central direction of the uplink beam optimally aligned. In another or further embodiment, a direction of the point ahead angle is fixed between periods of varying the point ahead angle for optimization.

Typically, an intensity profile of the uplink beam U0 decreases gradually away from a center of the beam. For example, the uplink beam typically has a Gaussian beam intensity profile which has highest intensity at the center and decreasing intensity away from the center. The downlink beam may have a similar or different intensity profile. The beam profiles may be distorted, e.g. by atmospheric interference. In any case, an optimum reception is usually achieved when the intensity of the received part of the beam is highest.

In some embodiments, a periodic directional variation $\Delta\theta$ is applied to the point ahead angle, e.g. by periodically tilting a mirror back and forth, e.g. PAM or FSM. For example, the direction of the point ahead angle is varied in accordance with a sinusoidal or sawtooth pattern. In one embodiment, a first directional variation is applied in direction along the point ahead angle $\theta a$ and a second directional variation is applied in a direction transverse to the point ahead angle $\theta a$. In other words the direction of the uplink beam U0 may be varied two-dimensionally in both directions to maintain alignment.

In some embodiments, the first directional variation is applied with a first frequency and the second directional variation is applied with a different, second frequency. Accordingly, a distinction can be made which directional variation to associate with intensity variation. In some embodiments, the first directional variation is applied with a different phase than the second directional variation, e.g. a circular or elliptical path may be traced by the uplink beam U0 around an initial or average point ahead angle using a half pi phase difference (sin, cos). It can also be envisaged to use a spiraling path. e.g. rotating outward or inward around the initial point ahead angle.

In some embodiments, a period of the directional variation is relatively large, e.g. longer than a roundtrip time between the terminals. By slowly varying the direction at the first terminal, the measurement of the intensity received back from the second terminal may still be applicable to be correlated with the direction. For example, the round trip time may be around 0.2 second while the directional variation is applied at a frequency of less than one Hertz. In other or further embodiments, a period of the directional variation is relatively small, e.g. less than the round trip time, preferably much less by at least a factor ten, hundred, thousand or more. For such embodiments it may be preferable to use some sort of synchronization to determine which direction the beam was varied to correlate the direction to the change in intensity and e.g. seek the maximum intensity. For example, the directional variation is applied at one or more frequencies of more than ten Hertz, more than hundred Hertz, more than one kilohertz, e.g. ten kilohertz. The directional variation may still be much less than frequencies for data communication. e.g. Megahertz or higher.

As described herein, the measured intensity for adjusting the point ahead angle will not be confused with any modulation of the uplink beam used for transmitting the data, e.g. when using amplitude modulation for communicating data. For example, if necessary, a (frequency) filter can be used to distinguish any variations intensity attributed to data transfer, and much slower variations in intensity attributed to the variation of the point ahead angle. Alternatively, or additionally, the intensity of the beam may be averaged to distinguish the angular variation from the data communication. Of course other forms of modulation, e.g. frequency modulation, may have even less effect on the (low frequency) intensity of the uplink beam.

In a preferred embodiment, a lateral variation in position $\Delta X$ of the uplink beam U0 at the second terminal 20 due to the directional variation $\Delta\theta$ (in one or more directions) is (equal or) less than a width W (e.g. FWHM intensity) of the uplink beam U0 at the second terminal 20, e.g. by at least a factor two, three, five, ten, twenty, fifty, or more. For example, the uplink beam may have a divergence of a few microradians resulting in beam width W of a few hundred meters at the satellite, e.g. more than five hundred meters, depending on the distance; and the lateral variation in position $\Delta X$ is preferably less than hundred meters. Alternatively, or additionally, this can be expressed by stating that the directional variation $\Delta\theta$ is less than a divergence or opening angle $\theta w$ of the uplink beam U0.

In a preferred embodiment, the directional variation $\Delta\theta$ is less than a microradian, less than half a microradian or less, e.g. between 0.001 and 0.1 µrad. For example, this may be compared to a typical divergence of at least one microradian. There can also be a minimum defined for the directional or positional variation, e.g. in relation to the beam divergence or width. For example, the variation in angle or position may be at least one percent of the beam divergence or width. For example, the directional variation is at least sufficient to have a measurable effect on the received intensity of the uplink beam U0 at the second terminal 20. For example, the directional variation may lead to a variation in intensity {e.g. (Imax−Imin)/Imax} of at least one percent, at least five percent, at least ten percent, or more, e.g. up to twenty or even fifty percent. In some embodiments, an amplitude of the directional variation of the uplink beam U0 is variably set in accordance with a variation of resulting intensities of the part of the uplink beam U0 measured at the second terminal 20. For example, it can be ensured that the signal strength stays within acceptable levels while maintaining the alignment.

In some embodiments, the first terminal 10 receives an indication of the respective intensity I1,I2 measured by the second terminal 20 via the reception channel Rx from the second terminal 20. In other or further embodiments, the first terminal 10 sends synchronization information for determining which respective point ahead angle $\theta 1,\theta 2$ was used via the transmission channel Tx to the second terminal. For example, the synchronization information comprises a timestamp T of a respective point ahead angle $\theta 1,\theta 2$ used at a time of transmitting the uplink beam U1,U2. Also other types of information can be sent, e.g. sending the actual used point ahead angle, or an index which can be traced to such setting.

In some embodiments, an indication of the respective point ahead angle $\theta 1,\theta 2$ used by the first terminal 10 for transmitting the respective uplink beam U1,U2 is sent by the first terminal 10 via the transmission channel Tx to the second terminal 20, wherein the first terminal 10 receives an indication of the respective intensity I1,I2 as a function of respective point ahead angle $\theta 1,\theta 2$ via the reception channel Rx from the second terminal 20. Also other methods of synchronization can be envisaged, e.g. using a frequency and/or phase of the measured intensity variations and correlating this to the frequency and/or phase of the applied directional variations.

Figure 2:
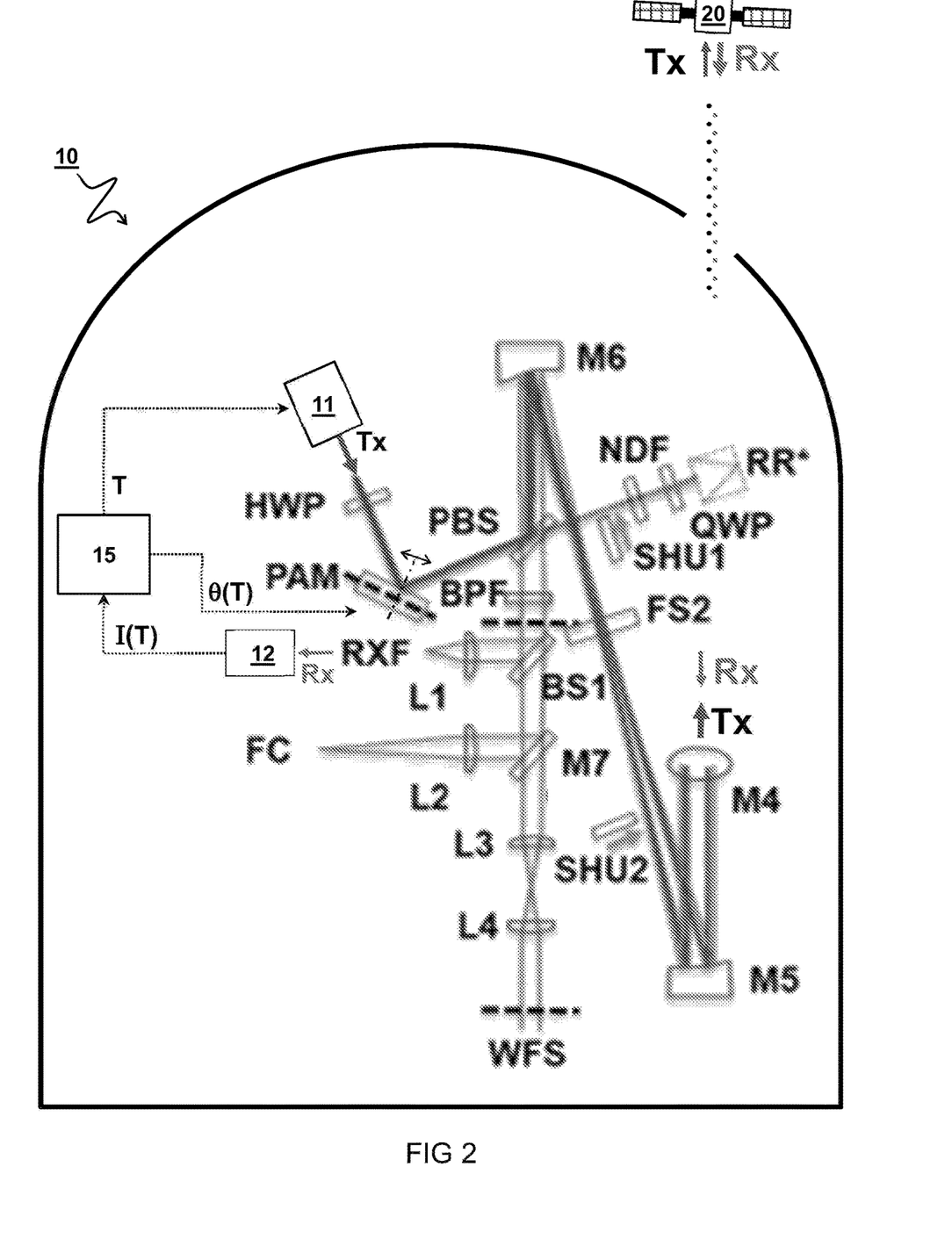
FIG. 2 illustrates a first terminal optically communicating with a second terminal.

FIG. 2 illustrates an embodiment of first terminal 10 for optically communication with a second terminal 20.

As described herein, the first terminal 10 may be configured to optically communicate with a second terminal 20. In some embodiments, the first terminal 10 comprises a light sensor 12. For example, the sensor is arranged for measuring a downlink beam D0. For example, or a processor linked to the sensor, is configured to receive data via the downlink beam D0 from the second terminal 20. In other or further embodiments, the terminal comprises a light source 11. For example, the light source is arranged for generating an uplink beam U0. For example, the light source, or a processor linked to the light source, is configured to transmit data via the uplink beam U0 to the second terminal 20. Typically, the light source may comprise multiple communication channels, i.e. multiple wavelengths. In some cases the co-alignment between those may not be perfect. Accordingly, the optimization described herein may also apply to each individual channel/wavelength.

In some embodiments, a point ahead mirror PAM is arranged in an optical path of the uplink beam U0. Preferably, the point ahead mirror is configured to variably set a point ahead angle θ determining a direction of transmission of the uplink beam U0 with respect the downlink beam D0. In some embodiments, this may be a variable point ahead angle, for instance for Ground to LEO communication the PAA may varies from e.g. +/−20 urad at the horizon to 50 urad at Zenith (straight up) and back to 20 urad again. In one embodiment, this variation is dynamically imposed on the point ahead mirror PAM, considering overflight times of e.g. 5 min for really low orbits to 30 min for higher orbits, or more.

In some embodiments, the first terminal 10 comprises a controller 15 configured and/or programmed to perform operational acts in accordance with the methods described herein. For example, the controller 15 is arranged to receive data via the reception channel Rx, transmit data via the transmission channel Tx, and/or control a direction of the point ahead mirror PAM. In one embodiment, the controller is configured to determine an initial point ahead angle θ0 for establishing a communication link with the second terminal 20.

In some embodiments, the controller is configured to apply a directional variation Δθ to the initial point ahead angle θ0 for emitting the uplink beam U1,U2 along different point ahead angles θ1,θ2 at different instances of time t1,t2. Preferably, the controller is configured to apply the directional variation Δθ while transmitting data via the transmission channel Tx from the first terminal 10 to the second terminal 20. In other or further embodiments, the controller is configured to read data from the reception channel Rx to determine a respective intensity I1,I2 of a part of the uplink beam U1,U2, received by the second terminal 20, emitted by the first terminal 10 along a respective point ahead angle θ1,θ2. In a preferred embodiment, the controller is configured to adjust the initial point ahead angle θ0 towards an optimized point ahead angle θa based on the respective intensity I1,I2 as function of the different point ahead angles θ1,θ2.

Some aspects described herein can be embodied as an earth based station comprising the first terminal 10, as described herein, e.g. configured to optically communicate with a satellite in orbit comprising the second terminal 20. In a some embodiments, the second terminal 20, e.g. satellite comprises a pointing device or tracker to direct the downlink beam D0 to the first terminal 10, e.g. ground station. In some embodiments, the second terminal 20 comprises a sensor to receive a locator or acquisition beam from the first terminal 10 and control the pointing device to direct the downlink beam D0, e.g. towards the location where the locator beam originates from. For example, the locator beam may be relatively wide so that it is easier for the second terminal 20 to lock onto. Alternatively, or in addition to the use of a locator beam, the second terminal 20 may comprise a controller keeping track of the relative position of the first terminal 10 directing the downlink beam D0 towards the first terminal 10. In some embodiments, the first terminal 10 adjusts a direction of the uplink beam U0 in accordance with a direction from which the downlink beam D0 is received, or vice versa for the second terminal 20. For example, a wavefront sensor WFS is used to determine a direction of the uplink beam U0 and/or downlink beam D0 in one or both of the first terminal 10 and/or second terminal 20.

In some embodiments, the initial point ahead angle 60 for establishing the communication link is determined by a first alignment stage. Depending on the design, the first alignment stage may typically prevent or interrupt the transmitting of data via the transmission and/or reception channel Rx,Tx. After the communication link is established, a second or further alignment stage can be used as described herein. For example, the point ahead angle θa is continually optimized or maintained by the directional variation Δθ and resulting intensity measurements of the uplink beam U0 while transmitting data via the transmission channel Tx of the uplink beam U0, and receiving data via the reception channel Rx of the downlink beam D0.

In some embodiments, the first alignment stage comprises relative alignment between the uplink beam U0 and the downlink beam D0. In one embodiment, e.g. as shown, in the relative alignment, the uplink beam U0 is redirected to a first sensor instead of being transmitted towards the second terminal 20. In some embodiments, the first sensor is used during communication with the second terminal 20 for measuring the downlink beam D0. For example, the first sensor is a wavefront sensor WFS. In one embodiment, e.g. as shown, the relative alignment comprises blocking an optical path of the communication link between the first terminal 10 and the second terminal 20. For example, a shutter SHU2 is closed to block any light of the downlink beam D0 from hitting the first sensor while measuring alignment of the uplink beam U0. Preferably, a power of the uplink beam U0 is reduced during the first alignment stage, compared to the active communication.

In the embodiment shown, for the first calibration stage the Tx channel is routed back towards the WFS channel. To allow for this, e.g. a retroreflector can be provided at the exit of a polarizing beam splitter PBS. Other provisions may include automatic shutters and a rotational stage for a half wave plate (HWP). During normal operation shutter SHU2 is open and shutter SHU1 is closed. For example, the HWP is oriented to get an S-polarized beam, to be reflected by the PBS towards mirror M6. When the calibration is started the Tx beams are rerouted towards the WFS by changing the HWP oriented to get a P-polarized beam, closing SHU2 and opening SHU1. By means of the additional quarter wave plate QWP2 the P-polarized is transformed in circular polarization, and, after the reflection on the retroreflector, rotated to a S-polarized beam. This beam directed back towards the PBS is reflected towards the WFS path. In addition the Tx power level can be reduced, e.g. to 3 Watt. As the Tx channel may be a sub-aperture of the Rx, the Tx beams may only partly illuminate the WFS. Based on the illuminated WFS sub-apertures tip/tilt can be determined with respect to the Rx channel. As the Tx beam may consist of multiple separate multiplexed channels, for each channel the tip/tilt alignment can be measured. If there is a only single corrector, the optimal position can be determined for the combination of channels. As may be clear from the description this calibration needs to interrupt operation, which should be minimized to allow for maximal availability. As such this calibration is suitable for correcting the more static errors and initial alignment. It can be expected that drift will be presented in the setup, and to omit the need for extreme stable operation for hours in a row an second stage of calibration is implemented.

To optimized the pointing and accommodate for drift effects a low bandwidth feedback control can be implemented. The feedback strategy can e.g. be based on extremum seeking and this feedback loop may includes the power level received at the satellite. In a preferred embodiment, a small (e.g. <0.1 μrad at telescope level) periodic (e.g. sinusoidal or sawtooth) perturbation can be induced by the PAM. In another or further embodiment, the system comprises a fast steering mirror (FSM, not shown) that e.g. corrects for the downlink beam. For example, the variation can be applied to one or both of the PAM and the FSM. In some embodiments, the effect on the received power at the satellite can be measured and communicated back towards the ground station. Based on this, the PAM position can be adapted towards its optimum. Considering the time constants to be corrected for may be large, but also in the loop delay itself, e.g. the communication latency is large, as such the aimed control bandwidth may be relatively low in some embodiments, e.g. below the 1 Hz level.

For the purpose of clarity and a concise description, features are described herein as part of the same or separate embodiments, however, it will be appreciated that the scope of the invention may include embodiments having combinations of all or some of the features described. For example, the functionality of a respective terminal, such as transmission and reception can be split over multiple terminals that may be integrated or separate, e.g. distributed, in a respective system such as a satellite or ground station. For example, while embodiments were shown for communication between a ground station and satellite, also alternative ways may be envisaged by those skilled in the art having the benefit of the present disclosure for achieving a similar function and result. Of course, it is to be appreciated that any one of the above embodiments or processes may be combined with one or more other embodiments or processes to provide even further improvements in finding and matching designs and advantages. It is appreciated that this disclosure offers particular advantages to optical communication with satellites, and in general can be applied for any application wherein alignment communication beams over large distances is desired.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method for maintaining a point ahead angle between an uplink beam from a first terminal to a second terminal, and a downlink beam from the second terminal to the first terminal, the method comprising:

providing a communication link for optical communication between the first terminal and the second terminal, wherein the communication link comprises:
a reception channel through which the first terminal receives data via the downlink beam from the second terminal, and
a transmission channel through which the first terminal transmits data via the uplink beam to the second terminal along an initial point ahead angle with respect to the downlink beam;
applying, while transmitting data via the transmission channel from the first terminal to the second terminal, a directional variation to the initial point ahead angle for emitting the uplink beam along different point ahead angles at different instances of time;
determining, at the second terminal, a respective intensity of a part of the uplink beam received by the second terminal that is emitted by the first terminal along a respective point ahead angle;
communicating an indication of the respective intensity, determined by the second terminal, to the first terminal via the reception channel and/or communicating an indication of the respective point ahead angle, used by the first terminal in emitting the uplink beam, to the second terminal via the transmission channel; and
adjusting, in the first terminal, the initial point ahead angle towards a point ahead angle based on the respective intensity, determined in the second terminal, as a function of the different point ahead angles at which the uplink beam was emitted by the first terminal,
wherein the emitting the uplink beam along the different point ahead angles comprises:
emitting, by the first terminal, the uplink beam as a first beam along a first point ahead angle with respect to the downlink beam;
determining, by the second terminal, a first intensity of a part of the first beam received by the second terminal;
emitting, by the first terminal, the uplink beam as a second beam along a second point ahead angle with respect to the downlink beam, wherein the second point ahead angle is different from the first point ahead angle;
determining, by the second terminal, a second intensity of a part of the second beam received by the second terminal; and
adjusting, by the first terminal, the initial point ahead angle based on a difference between the first intensity and second intensity.

2. The method of claim 1, wherein the initial point ahead angle is adjusted in a direction of highest intensity.

3. The method of claim 1, wherein a direction of the point ahead angle is continuously varied as a function of time, wherein an average or center of the varying point ahead angle is determined based on respective intensities varying as a result of the applied directional variation.

4. The method of claim 1, wherein the directional variation is applied by periodically tilting a point ahead mirror or fast steering mirror back and forth.

5. A method for maintaining a point ahead angle between an uplink beam from a first terminal to a second terminal, and a downlink beam from the second terminal to the first terminal, the method comprising:
providing a communication link for optical communication between the first terminal and the second terminal, wherein the communication link comprises:

a reception channel through which the first terminal receives data via the downlink beam from the second terminal, and a transmission channel through which the first terminal transmits data via the uplink beam to the second terminal along an initial point ahead angle with respect to the downlink beam;

applying, while transmitting data via the transmission channel from the first terminal to the second terminal, a directional variation to the initial point ahead angle for emitting the uplink beam along different point ahead angles at different instances of time;

determining, at the second terminal, a respective intensity of a part of the uplink beam received by the second terminal that is emitted by the first terminal along a respective point ahead angle;

communicating an indication of the respective intensity, determined by the second terminal, to the first terminal via the reception channel and/or communicating an indication of the respective point ahead angle, used by the first terminal in emitting the uplink beam, to the second terminal via the transmission channel; and adjusting, in the first terminal, the initial point ahead angle towards a point ahead angle based on the respective intensity, determined in the second terminal, as a function of the different point ahead angles at which the uplink beam was emitted by the first terminal, wherein a repeating directional variation is applied with a period shorter than a roundtrip time between the terminals.

6. The method of claim 5, wherein a first directional variation is applied in a direction along the point ahead angle and a second directional variation is applied in a direction transverse to the point ahead angle.

7. The method of claim 5, wherein the directional variation is configured to cause a variation in intensity of the part of the uplink beam received at the second terminal, wherein the variation in intensity is between one and twenty percent.

8. The method of claim 1, wherein a first directional variation is applied in a direction along the point ahead angle and a second directional variation is applied in a direction transverse to the point ahead angle.

9. The method of claim 1, wherein the first terminal sends synchronization information for determining which respective point ahead angle was used via the transmission channel to the second terminal.

10. A method for maintaining a point ahead angle between an uplink beam from a first terminal to a second terminal, and a downlink beam from the second terminal to the first terminal, the method comprising:

providing a communication link for optical communication between the first terminal and the second terminal, wherein the communication link comprises:

a reception channel through which the first terminal receives data via the downlink beam from the second terminal, and a transmission channel through which the first terminal transmits data via the uplink beam to the second terminal along an initial point ahead angle with respect to the downlink beam;

applying, while transmitting data via the transmission channel from the first terminal to the second terminal, a directional variation to the initial point ahead angle for emitting the uplink beam along different point ahead angles at different instances of time;

determining, at the second terminal, a respective intensity of a part of the uplink beam received by the second terminal that is emitted by the first terminal along a respective point ahead angle;

communicating an indication of the respective intensity, determined by the second terminal, to the first terminal via the reception channel and/or communicating an indication of the respective point ahead angle, used by the first terminal in emitting the uplink beam, to the second terminal via the transmission channel; and adjusting, in the first terminal, the initial point ahead angle towards a point ahead angle based on the respective intensity, determined in the second terminal, as a function of the different point ahead angles at which the uplink beam was emitted by the first terminal, wherein an indication of the respective point ahead angle used by the first terminal for transmitting the respective uplink beam is sent by the first terminal via the transmission channel to the second terminal and the first terminal receives an indication of the respective intensity as a function of respective point ahead angle via the reception channel from the second terminal.

11. The method of claim 1, wherein a lateral variation in position of the uplink beam at the second terminal due to the directional variation is less than a full width half maximum of the uplink beam at the second terminal by at least a factor two.

12. The method of claim 1, wherein the directional variation is configured to cause a variation in intensity of the part of the uplink beam received at the second terminal, wherein the variation in intensity is between one and twenty percent.

13. The method of claim 1, wherein the initial point ahead angle for establishing the communication link is determined by a first alignment stage, wherein the first alignment stage prevents or interrupts the transmitting of data via the transmission and/or reception channel, wherein after the communication link is established a second alignment stage is used, wherein the point ahead angle is continually updated or maintained by the directional variation and resulting intensity measurements of the uplink beam while transmitting data via the transmission channel of the uplink beam, and receiving data via the reception channel of the downlink beam.

14. The method of claim 13, wherein the first alignment stage comprises relative alignment between the uplink beam and the downlink beam, wherein in the relative alignment, the uplink beam is redirected to a first sensor instead of being transmitted towards the second terminal, wherein the first sensor is used during communication with the second terminal for measuring the downlink beam, wherein the first sensor is a wavefront sensor, wherein the relative alignment comprises blocking an optical path of the communication link between the first terminal and the second terminal.

15. A first terminal configured to optically communicate with a second terminal, wherein the first terminal comprises:

a light sensor arranged for measuring a downlink beam and configured to receive data via the downlink beam from the second terminal;

a light source arranged for generating an uplink beam and configured to transmit data via the uplink beam to the second terminal;

a point ahead mirror arranged in an optical path of the uplink beam and configured to variably set a point ahead angle determining a direction of transmission of the uplink beam with respect the downlink beam; and a controller arranged to receive data via a reception channel, transmit data via a transmission channel, and control a direction of the point ahead mirror, wherein the controller is configured to:
determine an initial point ahead angle for establishing a communication link with the second terminal;
apply a directional variation to the initial point ahead angle for emitting the uplink beam along different point ahead angles at different instances of time while transmitting data via the transmission channel from the first terminal to the second terminal;
reading data from the reception channel to determine a respective intensity of a part of the uplink beam, received by the second terminal, emitted by the first terminal along a respective point ahead angle; and
adjust the initial point ahead angle towards an optimized point ahead angle based on the respective intensity as function of the different point ahead angles,
wherein the controller is configured to control a direction of the point ahead mirror to apply a repeating directional variation with a period shorter than a roundtrip time between the terminals.

16. The first terminal of claim 15 forming part of an earth based station, wherein the first terminal is configured to optically communicate with a satellite in orbit comprising the second terminal.

17. The first terminal of claim 15, wherein the controller is configured to control a direction of the point ahead mirror to apply the directional variation by periodically tilting the point ahead mirror back and forth.

18. The first terminal of claim 15, wherein the controller is configured to control a direction of the point ahead mirror to apply a first directional variation in direction along the point ahead angle and a second directional variation in a direction transverse to the point ahead angle.

19. The first terminal of claim 15, wherein the controller is configured to send synchronization information via the transmission channel for determining which respective point ahead angle was used via the transmission channel to the second terminal.

20. A first terminal configured to optically communicate with a second terminal, wherein the first terminal comprises:
a light sensor arranged for measuring a downlink beam and configured to receive data via the downlink beam from the second terminal;
a light source arranged for generating an uplink beam and configured to transmit data via the uplink beam to the second terminal;
a point ahead mirror arranged in an optical path of the uplink beam and configured to variably set a point ahead angle determining a direction of transmission of the uplink beam with respect the downlink beam; and
a controller arranged to receive data via a reception channel, transmit data via a transmission channel, and control a direction of the point ahead mirror, wherein the controller is configured to:
determine an initial point ahead angle for establishing a communication link with the second terminal;
apply a directional variation to the initial point ahead angle for emitting the uplink beam along different point ahead angles at different instances of time while transmitting data via the transmission channel from the first terminal to the second terminal;
reading data from the reception channel to determine a respective intensity of a part of the uplink beam, received by the second terminal, emitted by the first terminal along a respective point ahead angle; and
adjust the initial point ahead angle towards an optimized point ahead angle based on the respective intensity as function of the different point ahead angles,
wherein the controller is configured to:
send an indication of the respective point ahead angle used for transmitting the respective uplink beam via the transmission channel to the second terminal, and
receive an indication of the respective intensity as a function of respective point ahead angle via the reception channel from the second terminal.

* * * * *